US012578710B2

(12) United States Patent
Carrara et al.

(10) Patent No.: US 12,578,710 B2
(45) Date of Patent: Mar. 17, 2026

(54) CONTAINER ORCHESTRATION BASED ON INDUSTRIAL DESIGN ENVIRONMENT CONTROL ARCHITECTURE

(71) Applicant: Rockwell Automation Technologies, Inc., Mayfield Heights, OH (US)

(72) Inventors: Anthony Carrara, Strongsville, OH (US); Shawn O. Stuart, West Chester, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 462 days.

(21) Appl. No.: 18/115,990

(22) Filed: Mar. 1, 2023

(65) Prior Publication Data

US 2024/0295872 A1 Sep. 5, 2024

(51) Int. Cl.
*G05B 19/418* (2006.01)

(52) U.S. Cl.
CPC ... *G05B 19/41865* (2013.01); *G05B 19/4185* (2013.01)

(58) Field of Classification Search
CPC ............ G05B 19/4186; G05B 19/4185; G05B 19/042
See application file for complete search history.

(56) References Cited

U.S. PATENT DOCUMENTS

| | | | |
|---|---|---|---|
| 10,715,388 B2 | 7/2020 | Fildebrandt et al. | |
| 11,182,206 B2 | 11/2021 | Jung et al. | |
| 11,474,873 B2 | 10/2022 | Biernat et al. | |
| 11,513,877 B2 | 11/2022 | Biernat et al. | |
| 2015/0134733 A1* | 5/2015 | Maturana ................ | H04L 67/12 709/203 |
| 2018/0024537 A1 | 1/2018 | Chauvet et al. | |

(Continued)

FOREIGN PATENT DOCUMENTS

| | | |
|---|---|---|
| KR | 20200027783 A | 3/2020 |
| WO | 2020184362 A1 | 9/2020 |

OTHER PUBLICATIONS

Liu, Y et al., "A Data-Centric Internet of Things Framework Based on Azure Cloud," IEEE Access, vol. 7, Mar. 27, 2019, 20 pages.

(Continued)

*Primary Examiner* — Kidest Worku
(74) *Attorney, Agent, or Firm* — Fletcher Yoder P.C.

(57) ABSTRACT

A non-transitory computer readable medium stores instructions that, when executed by a processor, cause the processor to receive a request to deploy a container within an industrial automation system to perform a data processing task, wherein the industrial automation system includes a plurality of devices each having a compute surface configured to perform one or more software tasks, retrieve a project code file for the industrial automation system that represents a structure of the industrial automation system, one or more functions of the industrial automation system, and computing resources available within the industrial automation system, identify, based on the data processing task and the project code file, a respective compute surface of a particular device of the plurality of devices to which to deploy the container, and deploy the container to the respective compute surface of the particular device to perform the data processing task.

20 Claims, 9 Drawing Sheets

(56) References Cited

U.S. PATENT DOCUMENTS

| | | | |
|---|---|---|---|
| 2018/0054469 A1 | 2/2018 | Simoncelli | |
| 2018/0173502 A1* | 6/2018 | Biskup | G06F 21/56 |
| 2019/0377604 A1 | 12/2019 | Cybulski | |
| 2020/0136906 A1 | 4/2020 | Bernat et al. | |
| 2020/0249928 A1 | 8/2020 | Zeng et al. | |
| 2020/0278892 A1 | 9/2020 | Nainar et al. | |
| 2020/0311617 A1 | 10/2020 | Swan et al. | |
| 2021/0089354 A1 | 3/2021 | Nixon et al. | |
| 2021/0096852 A1* | 4/2021 | Stump | G06N 20/00 |
| 2021/0200814 A1 | 7/2021 | Tal et al. | |
| 2021/0218617 A1 | 7/2021 | Palavalli et al. | |
| 2021/0382727 A1 | 12/2021 | Vigil et al. | |
| 2022/0012031 A1* | 1/2022 | Takahashi | G06F 9/45558 |
| 2022/0027217 A1 | 1/2022 | Thoemmes et al. | |
| 2022/0091572 A1 | 3/2022 | Biernat et al. | |
| 2022/0171371 A1* | 6/2022 | Wang | G05B 19/41845 |

OTHER PUBLICATIONS

Extended European Search Report for European Patent Application No. 21179775.8, dated Nov. 25, 2021, 9 pages.

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-picfrom-controller-to-cloud-interface , retrieved on Nov. 29, 2021, pp. 1-6.

European Search Report for European Patent Application No. 21180068.5, dated Mar. 28, 2022,19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022,12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

* cited by examiner

330

RECEIVE REQUEST TO DEPLOY
CONTAINER(S) WITHIN OT NETWORK — 332

IDENTIFY COMPUTE SURFACE(S)
TO RUN CONTAINER(S) BASED ON
PROJECT CODE FILE AND REQUEST — 334

DEPLOY CONTAINER(S)
TO IDENTIFIED COMPUTE SURFACE(S) — 336

PERFORM REQUESTED TASK(S) — 338

SPIN DOWN CONTAINERS — 340

CONTAINER ORCHESTRATION BASED ON INDUSTRIAL DESIGN ENVIRONMENT CONTROL ARCHITECTURE

BACKGROUND

The present disclosure generally relates to systems and methods for implementing a container orchestration system in an operational technology (OT) network associated with one or more industrial automation systems. More particularly, embodiments of the present disclosure are related to systems and methods for leveraging industrial automation project code files with container orchestration systems.

Industrial automation systems are managed and operated using automation control and monitoring systems (e.g., industrial control systems), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Industrial automation systems may be initially designed in an integrated design environment (IDE). However, over time, as components of the industrial automation system are updated or replaced with new components, and/or as components are added and/or removed from the industrial automation system, the actual industrial automation system may be different from the system set forth in a project code file generated based on the design created in the IDE. Additionally, as containers are utilized by the industrial automation system, if may be difficult to identify available computing resources in the industrial automation system that may be utilized to run containers.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer readable medium stores instructions that, when executed by a processor, cause the processor to receive an indication of a modification to a particular device of an industrial automation system, wherein the industrial automation system includes a plurality of devices, including the particular device, configured to perform a plurality of operations within the industrial automation system, and wherein the particular device includes a compute surface configured to perform one or more software tasks, deploy a container to the compute surface of the particular device of the plurality of devices, retrieve one or more sets of rules and a project code file for the industrial automation system, wherein the project code file includes a portion of code that represents a structure of the industrial automation system and one or more functions of the industrial automation system, determine, via the container, that the modification complies with the one or more sets of rules, update, via the container, the project code file to reflect the modification to the particular device of the industrial automation system, and store the updated project code file in memory.

In another embodiment, a method includes receiving an indication of a modification to an industrial automation system, wherein the industrial automation system includes a plurality of devices configured to perform a plurality of operations within the industrial automation system, and wherein each of the plurality of devices includes a compute surface configured to perform one or more software tasks, deploying a container to the respective compute surfaces of at least one of the plurality of devices, retrieving one or more sets of rules and a project code file for the industrial automation system, wherein the project code file includes a portion of code that represents a structure of the industrial automation system and various functions of the industrial automation system, determining, via the container, that the modification complies with the one or more sets of rules, updating, via the container, the project code file to reflect the modification to the industrial automation system, and storing the updated project code file in memory.

In a further embodiment, a method includes identifying a modification to an industrial automation system, wherein the industrial automation system includes a plurality of devices configured to perform a plurality of operations within the industrial automation system, and wherein each of the plurality of devices includes a compute surface configured to perform one or more software tasks, deploying a container to the respective compute surfaces of at least one of the plurality of devices, retrieving one or more sets of rule and a project code file for the industrial automation system, wherein the project code file includes a portion of code that represents a structure of the industrial automation system and various functions of the industrial automation system, determining, via the container, that the modification complies with the one or more sets of rules, updating, via the container, the project code file to reflect the modification to the industrial automation system, transmitting the updated project code file, and spinning down the container.

In a further embodiment, a non-transitory computer readable medium stores instructions that, when executed by a processor, cause the processor to receive a request to deploy a container within an industrial automation system to perform a data processing task, wherein the industrial automation system includes a plurality of devices configured to perform a plurality of operations within the industrial automation system, and wherein each of the plurality of devices includes a compute surface configured to perform one or more software tasks, retrieve a project code file for the industrial automation system, wherein the project code file includes a portion of code that represents a structure of the industrial automation system, one or more functions of the industrial automation system, and computing resources available within the industrial automation system, identify, based on the data processing task and the project code file, a respective compute surface of a particular device of the plurality of devices to which to deploy the container, and deploy the container to the respective compute surface of the particular device of the plurality of devices, wherein the container is configured to perform the data processing task.

In a further embodiment, a method includes receiving a request to deploy a container within an industrial automation system to perform a data processing task, wherein the industrial automation system includes a plurality of devices configured to perform a plurality of operations within the industrial automation system, and wherein each of the plurality of devices includes a compute surface configured to perform one or more software tasks, retrieving a project code file for the industrial automation system, wherein the project code file includes a portion of code that represents a structure of the industrial automation system, one or more functions of the industrial automation system, and computing resources available within the industrial automation system, identifying, based on the data processing task and the project code file, a respective compute surface of a particular device of the plurality of devices to which to deploy the container, deploying the container to the respective compute surface of the particular device of the plurality of devices, wherein the container is configured to perform the data processing task, monitoring the deployed container as the deployed container performs the data processing task, and spinning down the deployed container.

In a further embodiment, a non-transitory computer readable medium stores instructions that, when executed by a processor, cause the processor to receive a request to deploy a container within an industrial automation system to perform a data processing task, wherein the industrial automation system includes a plurality of devices configured to perform a plurality of operations within the industrial automation system, and wherein each of the plurality of devices includes a compute surface configured to perform one or more software tasks, retrieve a project code file for the industrial automation system, wherein the project code file includes a portion of code that represents a structure of the industrial automation system, one or more functions of the industrial automation system, and computing resources available within the industrial automation system, identify, based on the data processing task and the project code file, a respective compute surface of a particular device of the plurality of devices to which to deploy the container, transmit a container image representative of the container to the respective compute surface of the particular device of the plurality of devices, wherein the respective compute surface of the particular device of the plurality of devices is configured to execute the container image to run the container, and monitor the container as the container performs the data processing task.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
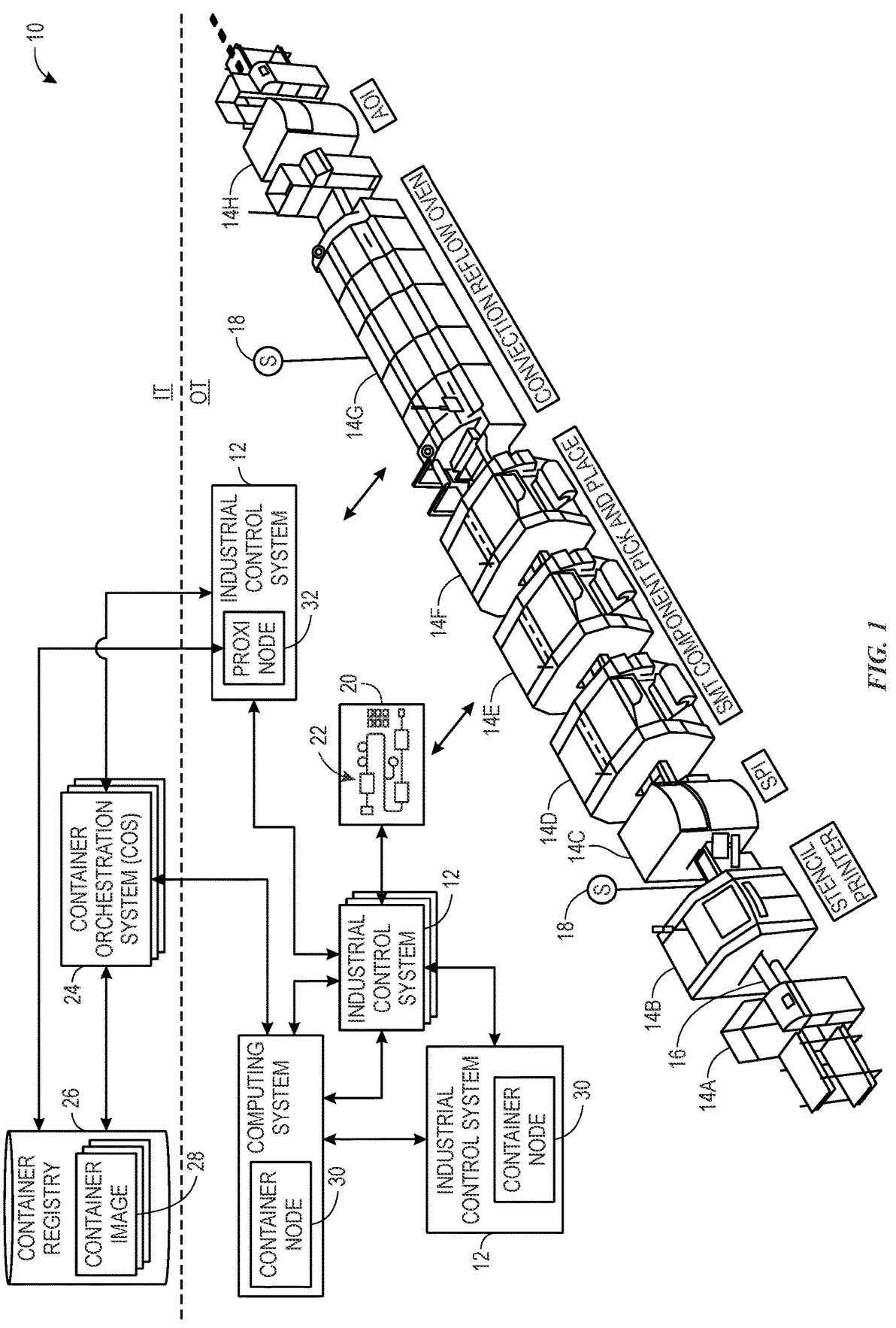
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed toward using industrial automation system project code files with container orchestration systems. Specifically, inputs may be provided to an integrated design environment (IDE) to design an industrial automation system. One or more rules may be applied to the inputs (e.g., via a rules engine) to validate that the inputs comply with the one or more rules, which may govern design of the industrial automation system. A project code file may be generated based on the inputs to the IDE that specify various aspects of the industrial automation system, such as a structure of the industrial automation system, one or more functions of the industrial automation system, logic and/or control schemes utilized by the industrial automation system, and so forth. Once the industrial automation system has been built out, the project code file and the one or more rules may be utilized by a container orchestration system to validate updates to the industrial automation system and update the project code file to reflect the updates to the industrial automation system, or generate a new project code file that reflects the updates to the industrial automation system. Specifically, the container orchestration system may receive an indication of an update or modification to the industrial automation system and deploy one or more containers to the industrial automation system. The deployed containers may confirm the update or modification and, in some cases, identify any additional updates/modifications that may have gone undetected. The containers may apply the one or more sets of rules to validate the updates or modifications, and then update the project code file to reflect the updates to the industrial automation system, or generate a new project code file that reflects the updates to the industrial automation system.

Further, the project code file may be utilized by the container orchestration system to identify available computing resources within the industrial automation system. For example, the container orchestration system may receive a request to deploy one or more containers within an industrial automation system to perform one or more tasks. The container orchestration system may utilize the project code file, and in some cases other data, to identify available compute surfaces or other computing resources within the industrial automation system. The container orchestration system may then deploy one or more containers to the identified compute surfaces for performance of the requested tasks. The container orchestration system may monitor the deployed containers as they perform the requested tasks and then spin the deployed containers down with the requested task has been completed.

Additional details with regard to use of project code files by container orchestration systems will be discussed below with reference to FIGS. 1-12.

By way of introduction, FIG. 1 is a perspective view of an example industrial automation system 10 controlled by one or more industrial control systems 12. The industrial automation system 10 includes stations 14A through 14H having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. It should be understood, however, that for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems

12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14A through 14H of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, managing data transmission between containers, performing load balancing, traffic routing, and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, compute surfaces, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
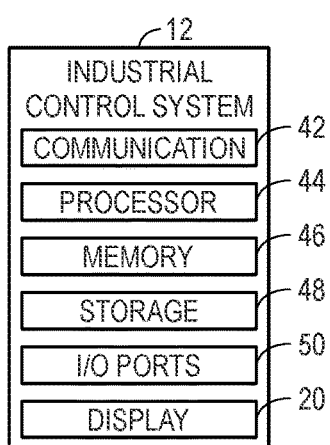
FIG. 2 is a block diagram of an example industrial control system, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
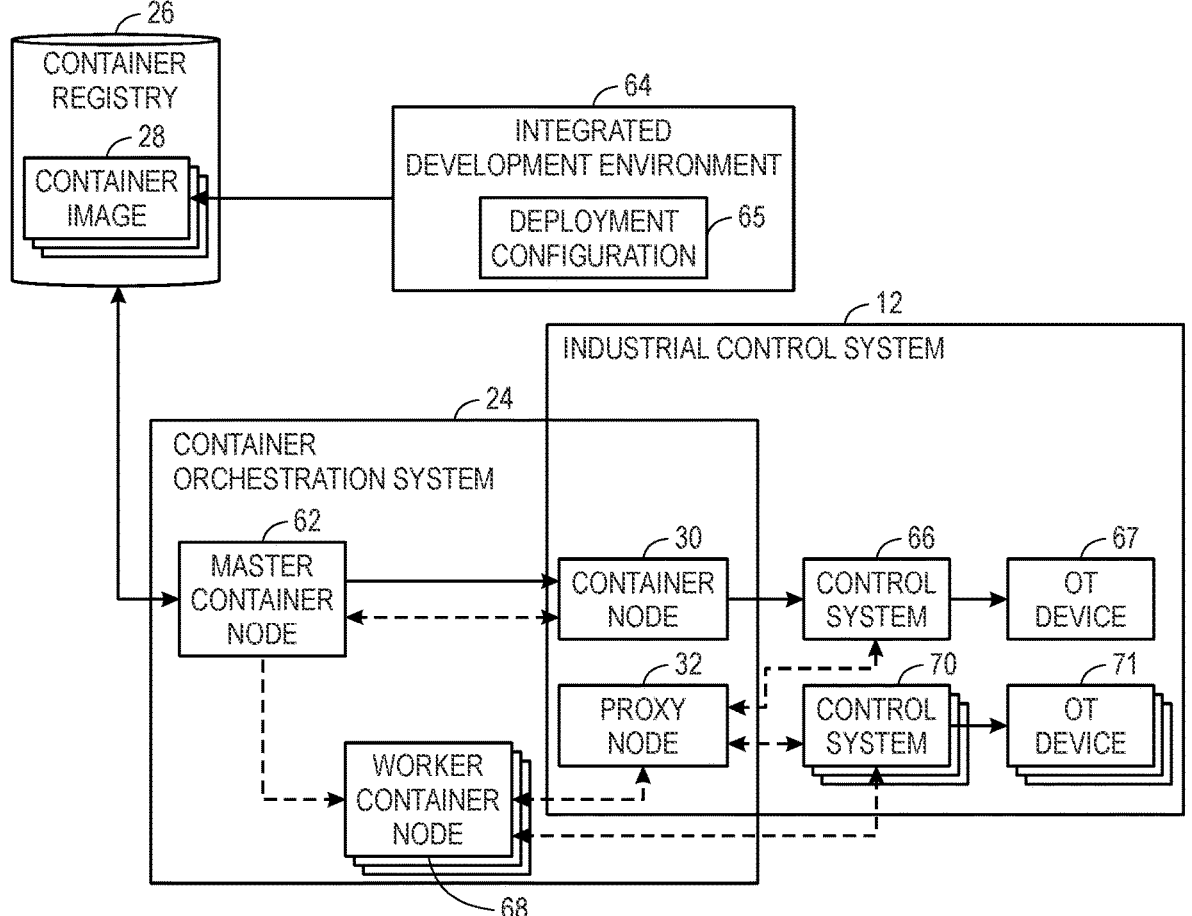
FIG. 3 is a block diagram of an example operational technology (OT) network that coordinates with a container orchestration system, in accordance with an embodiment.

With the foregoing in mind, FIG. 3 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 3, the container orchestration system 24 may include a master node 62 that may execute control plane processes for the container orchestration system 24. The control plane processes may include the processes that enable the container orchestration system 24 to coordinate operations of the container nodes 30 to meet the desired states. As such, the master container node 62 may execute an applications programming interface (API) for the container orchestration system 24, a scheduler component, core resource controllers, and the like. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like. The master container node 62 may run an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the master container node 62 may deploy containers to the container host nodes 30. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk LiveData, EtherNet/IP. Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean). Because the industrial control systems 12 operate in the OT space, the industrial control systems may not be capable of implementing commands received via the container orchestration system 24.

In certain embodiments, the container node 30 may be programmed or implemented in the industrial control system 12 to serve as a node agent that can register the industrial control system 12 with the master container node 62. The node agent may or may not be the same as the proxy node 32 shown in FIG. 1. For example, the industrial control system 12 may include a programmable logic controller (PLC) that cannot support an operating system (e.g., Linux) for receiving and/or implementing requested operations issued by the container orchestration system 12. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

In the present embodiments described herein, the control system 66 may thus perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestration system 24 and the OT-based industrial control system 12.

Figure 4:
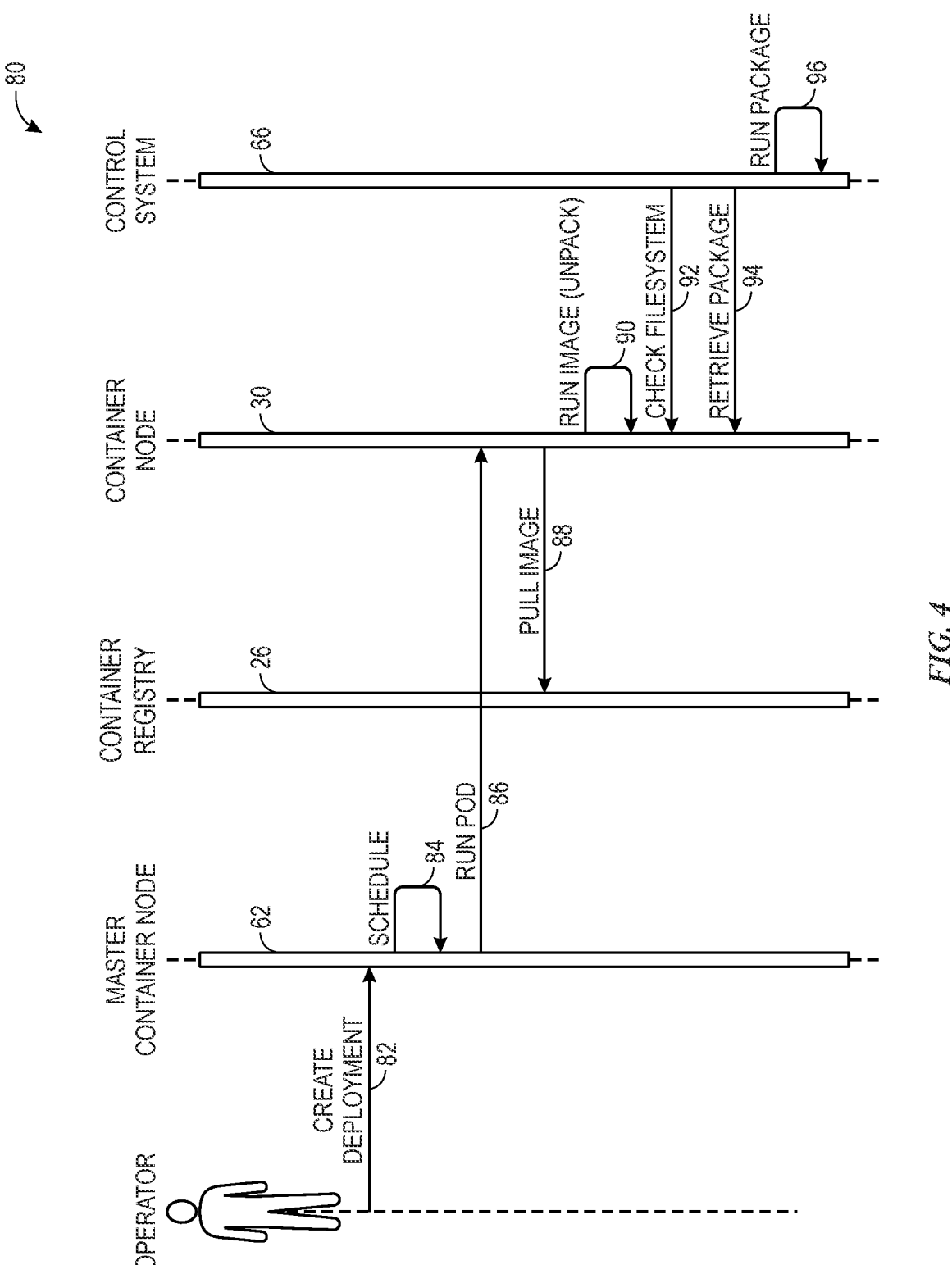
FIG. 4 is a sequence diagram illustrating the deployment of container pods to industrial control systems in the OT network of FIG. 3, in accordance with an embodiment.

FIG. 4 illustrates a sequence diagram 80 that tracks the deployment of a container using the master container node 62 and the container node 30 described above with reference to FIG. 3. At step 82, the IDE tool 64 may create a deployment of the deployment configuration file 65 to the master container node 62. After receiving the deployment configuration file 65, the master container node 62 may identify a container node 30 that may fit the constraint specifications (e.g., memory, CPU availability) provided in the deployment configuration file 65. That is, the master container node 62 performs scheduling operations that involve checking the state data for each node of the container orchestration system 24, determining whether a suitable node exists for the constraints provided in the deployment configuration file 65, and the like.

After identifying the suitable container node, at step 84, the master container node 62 may schedule the deployment of the container to the respective container node 30. At step 86, the master container node 62 may deploy a pod to the container node 30, which may cause the container node 30 to retrieve a container image 28 from the container registry 26 at step 88. In this way, the container node 30 is configured to receive pods from the master container node 62 and execute the pods, although the control system 66 of the industrial control system 12 may not be able to execute the pod. After pulling the container image 28 from the container registry 26, the container node 30 may, at step 90, run the container image 28 or unpack the container image 28 and store an application or operation executable by the control system 66 in a file system. At step 92, the control system 66 may check the file system of the container node 30 for updates or newly stored packages. At step 94, the control system 66 may retrieve the stored package that may include the container scheduled for operation by the control system 66 by the master container node 62 at step 84. At step 96, the control system 66 may execute the package retrieved from the file system of the container node 30. The container node 30 may then monitor the operations of the package being executed on the control system 66, the state (e.g., memory, CPU usage) of the control system 66 and send updates to the master container node 62. If the container node 30 sends an update indicative of the package no longer executing the package, the master container node 62 may schedule deployment of another pod to another container node 30 for execution to maintain the desired state.

Figure 5:
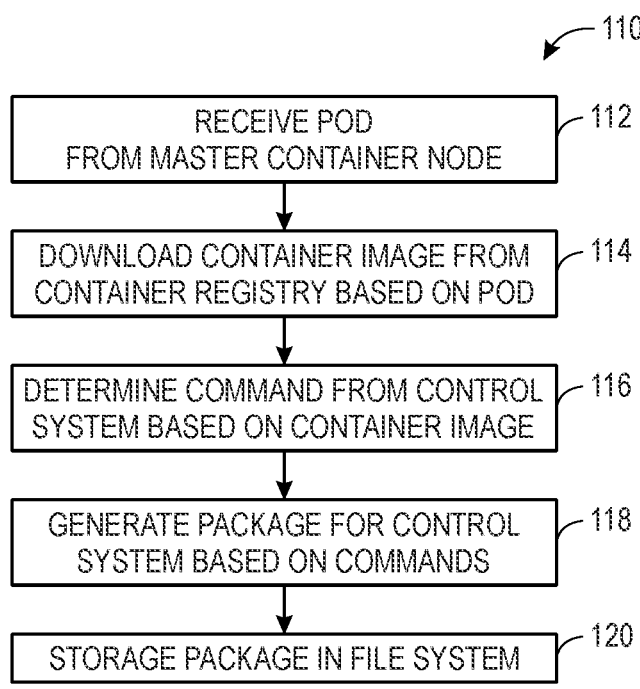
FIG. 5 is a flow chart of a method for the industrial control system passively implementing commands received via the control orchestration system, in accordance with an embodiment.

Keeping the foregoing in mind, FIG. 5 illustrates a method 110 in which the container node 30 may implement to coordinate activities via the master container node 62 of the container orchestration system 24. Although the following description of the method 110 is described as being performed by the container node 30, it should be understood that any suitable container node that is configured to interface with the cluster of nodes of the container orchestration system 24 and the industrial control system 12 may perform the operations described herein. In addition, although the method 110 is described in particular order, it should be understood that the method 110 may be performed in any suitable order.

Referring now to FIG. 5, at block 112, the container node 30 may receive a pod from the master container node 62. As mentioned above, pods may include one or more containers that are deployed to a host (e.g., container node 30). In some embodiments, the pod may operate to specify coordinated operations between a group of containers. The pod may include an indication or reference to a storage location for one or more container images 28 related to the pod. In some embodiments, the container images 28 may be stored in the container registry 26. As such, the pod may provide an indication of a network address or other address for accessing a memory location in the container registry 26.

After receiving the pod from the master container node 62, at block 114, the container node 30 may download the related container images 28 from the container registry 26. The container image 28, as mentioned above, represents data that encapsulates an application and its software dependencies. The container images 28 may be executable software bundles that may execute as standalone software without regard to the operating system that the corresponding container node 30 is using. In some embodiments, the container node 30 may receive the container images directly from the container registry 26, via the master container node 62, or any other suitable communication schemes.

After receiving the container images 28, at block 116, the container node 30 may run or unpack the container images 28 and determine commands that may be performed by the control system 66 based on the container images 28. That is, the container images 28 may include software applications that are executable by container nodes 30. However, the software applications may not be executable by the control system 66. As such, the container node 30 may determine commands for the control system 66 that correspond to the software applications encapsulated in the container images 28. In some embodiments, certain operations in the software applications may be mapped to certain operations that may be performed by the control system 66. For example, software application commands for create, run, start, pause, stop, and delete may map to download, download/run, run, idle, and unload commands, respectively, which may be performed by the control system 66. In some embodiments, the control system 66 may be used to perform a macro batch control sequence.

After determining the commands that may be implemented by the control system 66 based on the container images 28, at block 118, the container node 30 may generate a package that may be retrieved and executed by the control system 66. That is, the container node 30 may organize or structure the determined commands into a software package that may be used by the control system 66. For example, if the control system 66 corresponds to a PLC, the package may be organized according to a programming structure (e.g. ladder logic) that the PLC may use to program itself.

At block 120, the container node 30 may store the package in a memory or filesystem that is accessible to the control system 66. In some embodiments, the container node 30 may not be capable of interfacing directly with the control system 66. However, the container node 30 may provide the control system 66 with access to its memory or storage components, such that the control system 66 may retrieve the stored package. The control system 66 may be programmed to periodically (e.g., daily, hourly) check the filesystem for updates or new packages available for downloading.

It should be noted that the method 110 may describe a passive-indirect mode of operation for the container node 30 as part of the container orchestration system 24. That is, the container node 30 is limited to performing a subset of commands that may be provided by the master container node 62, as opposed to performing all of the commands that nodes that are part of the container orchestration system 24 are capable of performing. Moreover, the container node 30 may not be able to perform all of the lifecycle operations provided in a container. For example, the container node 30 may facilitate a package download operation for the control system 66, as described above, but it may not be able to perform every function specified in the container if the control system 66 does not have a corresponding operation that can be mapped to the respective container lifecycle operation.

In some embodiments, the container node 30 may operate in a passive-direct mode of operation in which the container node 30 may participate as a node in the container orchestration system 24. As such, the container node 30 may support a full set of container lifecycle operations. That is, since the control system 66 may be capable of implementing a limited set of commands provided by the master container node 62, the container node 30 may be implemented or executed by a sidecar compute module that may host a container host daemon that may perform the full suite of operations that a node in the container orchestration system 24 may perform. As such, the sidecar compute module may be any suitable computing system that is capable of executing an operating system (OS), such that commands received from the master container node 62 may be implemented by the respective sidecar compute module.

By implementing the container node 30 in the sidecar compute module, the container node 30 may be operating as a node that is part of the container orchestration system 24 but operating in the OT space. As a result, the container node 30 may extend the functions available via the container orchestration system 24 to OT devices 67 that are not typically visible to the master container node 62 of the container orchestration system 24. To operate in the passive-direct mode, the container node 30 may include applications and/or APIs that interface directly with the control system 66 and the master container node 62. As such, the container node 30 may provide a bi-directional bridge of communication between the control system 66 and the master container node 62. In some embodiments, the container node 30 may include an API that translates the OT data received from the control system 66 into IT data that may be interpretable by the master container node 62. As such, the container node 30 may provide the master container node 62 with visibility into the operations and states of the OT devices 67 operating in the OT space.

Figure 6:
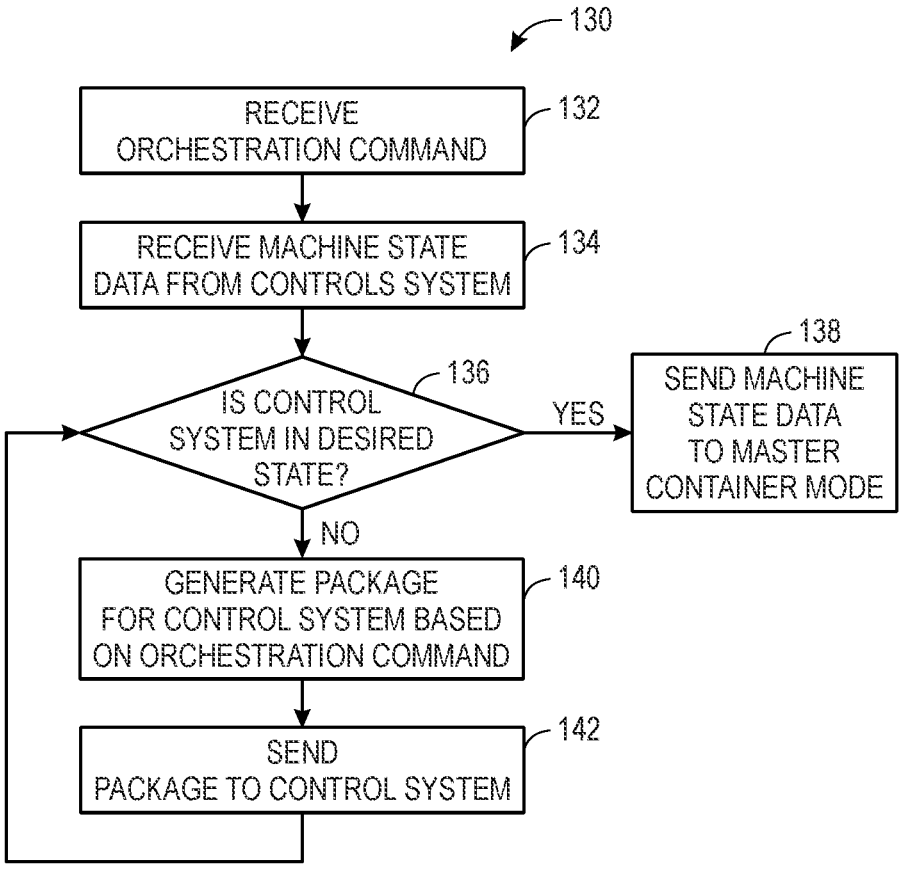
FIG. 6 is a flow chart of a method for the industrial control system actively implementing commands received via the control orchestration system, in accordance with an embodiment.

With this in mind, FIG. 6 illustrates a method 130 for the container node 30 directly sending packages to the control system 66 and machine state data to the master container node 62 in accordance with embodiments described herein. Like the method 110 described above, the following description of the method 130 may be performed by any suitable computing system and any suitable order. It should be noted that the method 130 described below corresponds to operating the container node 30 in the passive-direct mode of operation. As such, the container node 30 may receive and interpret orchestration commands received from the master container node 62 or the like and directly interface with the control system 66 to verify that the control system 66 is operating at the desired state.

Referring to FIG. 6, at block 132, the container node 30 may receive an orchestration command from the master container node 62 or some other node that is part of the container orchestration system 24. The orchestration command may include an instruction regarding one or more containers that the control system 66 should currently be executing. As such, the orchestration command may be part of a monitor function that causes the container node 30 to verify that the machine state data of the control system 66 corresponds to an expected machine state, as specified by the deployment configuration file 65.

At block 134, the container node 30 may retrieve machine state data from the control system 66. The machine state data may include current operational state (e.g., active, inactive) of the respective OT device controlled by the control system 66, available processing resources (e.g., CPU availability), available memory resources (e.g., storage, RAM), and the like. The machine state data may also indicate whether any containers are being executed by the control system 66. As such, the machine state data may be reported back to the master container node 62 to ensure that the desired state specified by the deployment configuration file 65 is present.

To receive the machine state data, the container node 30 may send requests to the control system 66 via an appropriate OT communication protocol. In response to receiving the requests, the control system 66 may query a database, memory cell, or other suitable storage that may include information regarding the requested data. After retrieving the requested information, the control system 66 may send the requested data to the container node 30 using the same OT communication protocol on which it received the request.

In some embodiments, the container node 30 may be embedded or integrated into one or more cores of the control system 66. As such, the container node 30 may communicate data with portions of the control system 66 using onboard communication methodologies. Alternatively, the container node 30 may directly retrieve the machine state data from the respective memory locations.

After receiving the machine state data from the control system 66, the container node 30 may, at block 136, determine whether the control system 66 is operating at a desired state based on the deployment configuration file 65. In the present embodiment, the container node 30 may evaluate whether the control system 66 is executing the containers, as specified in the deployment configuration file 65. That is, since the container node 30 may execute the container daemon host, the container node 30 may participate in the management of the containers distributed throughout the container orchestration system 24 by monitoring the machine state data of the control system 66.

If the control system 66 is operating in the desired state, the container node 30 may proceed to block 138 and send the machine state data to the master container node 62. The master container node 62 may then check whether other container nodes 30 are achieving the desire states.

If, however, the container node 30 determines that the control system 66 is not operating in the desired state, the container node 30 may proceed to block 140 and generate a package that may cause the control system 66 to modify its operations to execute the corresponding pod and the containers therein. After generating the package, the container node 30 may send the package directly to the control system 66 to execute. In this way, the container node 30 operates in the passive-direct mode because the container node 30 may directly send commands that cause the control system 66 to change operations. For example, instead of the control system 66 periodically checking the filesystem, as described above with respect to FIG. 5 (e.g., passive-indirect mode), the control system 66 may directly interface with the container node 30 and receive commands that may cause it to adjust operations of a connected device (e.g., OT device), execute received packages, and the like. As such, the container node 30 may push packages, firmware updates, OT device credential updates, security updates, encryption keys, and other data to the control system 66 at any given time. That is, the container system 30 may generate an event notification that causes an API or other component of the control system 66 to react in response to detecting the event notification. In other embodiments, the container node 30 may determine that it is safe to perform certain actions, such as changing state to download a firmware update, perform maintenance/service, etc. In this way, the container node 30 may actively participate in the coordination of containers with a respective control system 66 based on orchestration commands received passively from the master container node 62 or the like.

By employing the container nodes 30 to enable the container orchestration system 24 to implement software containers on control systems 66, the present embodiments described herein may allow for coordinating control of a number of control systems 66 and a number of OT devices 67 to control operations in the industrial automation system 10. That is, desired machine states may include desired operating parameters for industrial equipment, and the container orchestration system 24 may monitor the available industrial equipment resources to ensure that the desired machine states are continuously being achieved by coordinating activities via the container nodes 30 communicatively coupled to the control systems 66.

In addition to operating in the passive-indirect mode and the passive-direct mode, the container node 30 may operate in an active mode, such that the container node may invoke container orchestration commands for other container nodes 30. For example, referring back to FIG. 3, a proxy node 32 may operate as a proxy or gateway node that is part of the container orchestration system 24. The proxy node 32 may be implemented in a sidecar computing module that has an operating system (OS) that supports the container host daemon. In another embodiment, the proxy node 32 may be implemented directly on a core of the control system 66 that is configured (e.g., partitioned), such that the control system 66 may operate using an operating system that allows the container node 30 to execute orchestration commands and serve as part of the container orchestration system 24. In either case, the proxy node 32 may serve as a bi-directional bridge for IT/OT orchestration that enables automation functions to be performed in IT devices based on OT data and in OT devices 67 based on IT data. For instance, the proxy node 32 may acquire OT device tree data, state data for an OT device, descriptive metadata associated with corresponding OT data, versioning data for OT devices 67, certificate/key data for the OT device, and other relevant OT data via OT communication protocols. The proxy node 32 may then translate the OT data into IT data that may be formatted to enable the master container node 62 to extract relevant data (e.g., machine state data) to perform analysis operations and to ensure that the container orchestration system 24 and the connected control systems 66 are operating at the desired state. Based on the results of its scheduling operations, the master container node 62 may issue supervisory control commands to targeted OT devices via the proxy nodes 32, which may translate and forward the translated commands to the respective control system 66 via the appropriate OT communication protocol.

In addition, the proxy node 32 may also perform certain supervisory operations based on its analysis of the machine state data of the respective control system 66. As a result of its analysis, the proxy node 32 may issue commands and/or pods to other nodes that are part of the container orchestration system 24. For example, referring to FIG. 3, the proxy node 32 may send instructions or pods to other worker container nodes 68 that may be part of the container orchestration system 24. The worker container nodes 68 may correspond to other container nodes 30 that are communicatively coupled to other control systems 70 for controlling other OT devices 71. In this way, the proxy node 32 may translate or forward commands directly to other control systems 70 via certain OT communication protocols or indirectly via the other worker container nodes 68 associated with the other control systems 70. In addition, the proxy node 32 may receive replies from the control systems 70 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 71 in a coordinated fashion. That is, the proxy node 32 may enable the container orchestration system to coordinate the activities of multiple control systems 66 and 70 to achieve a collection of desired machine states for the connected OT devices 67 and 71.

Figure 7:
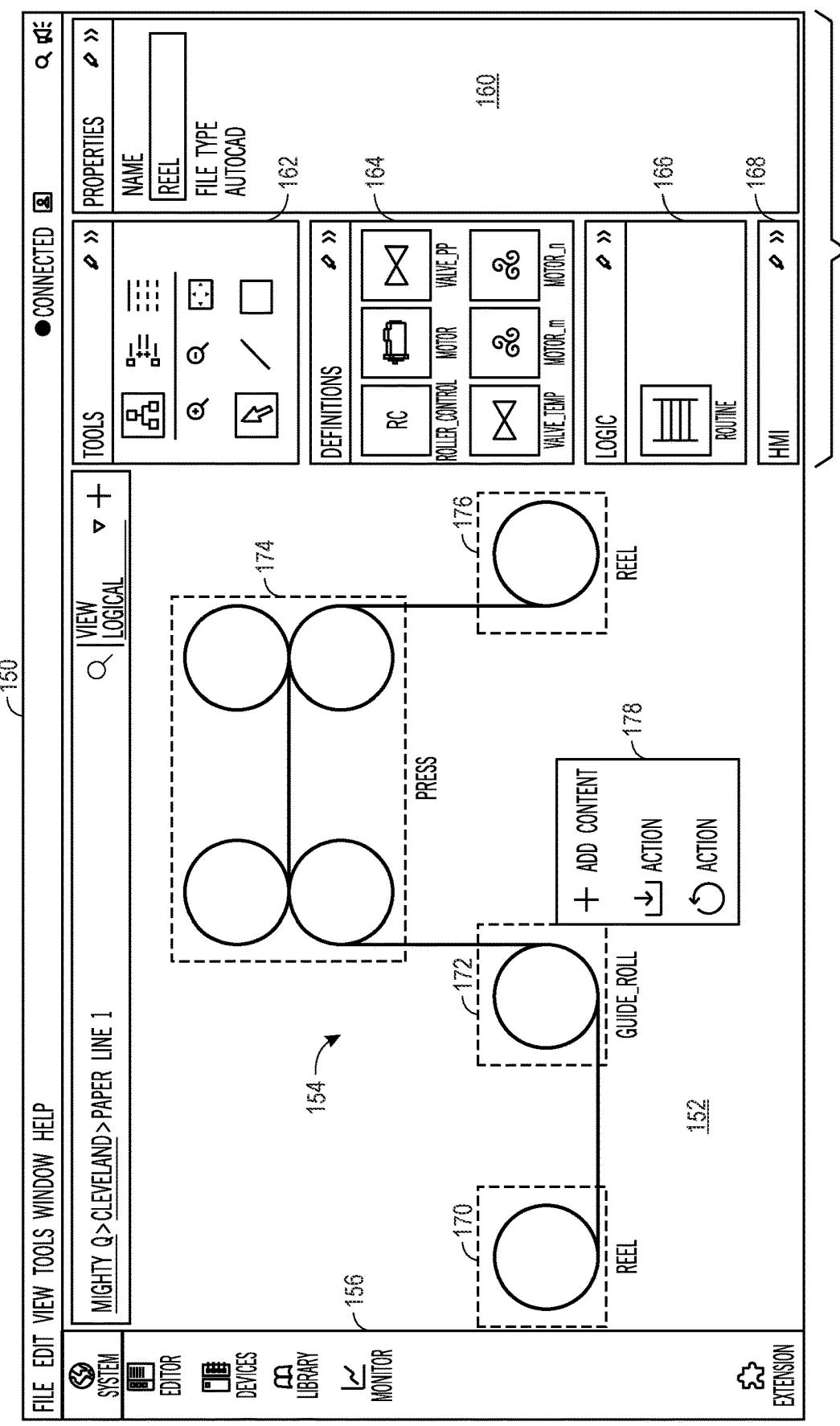
FIG. 7 is a screenshot of a graphical user interface (GUI) of an integrated design environment (IDE) for designing an industrial automation project that is representative of an industrial automation system, in accordance with an embodiment.

Industrial automation systems, such as the industrial automation system 10 shown in FIG. 1, are designed by one or more designers before being built and installed. FIG. 7 is a screenshot of a graphical user interface (GUI) 150 of an integrated design environment (IDE) for designing an industrial automation project that is representative of an industrial automation system. As shown, the GUI 150 includes a design region 152, which displays a graphical representation of the industrial automation system 154, a vertical navigation bar 156, which allows a user to navigate through various functions of the IDE, and an accessory region 158, which may be configured to display properties 160 of a selected component, various libraries, such as a project library or one or more external libraries, which may include, for example, a toolbox 162, definitions/objects 164, logic 166, human machine interface (HMI) widgets 168 and so forth. As shown, a user may draw boundary lines in the design region 152 to define areas (e.g., a first reel area 170, a guide roll area 172, a press area 174, and a second reel area 176) within the project, each of which may include one or more components that work in concert to perform a function. In some embodiments, the components within an area may be further grouped into sub-areas and/or modules. After an area boundary has been drawn, the user may provide characteristic information for the area, such as a name, a function, guidelines for what happens in the area, a process flow through the areas, and so forth. As the user provides inputs defining the industrial automation system, pop-up windows 178 may appear that provide a user with options to, for example, add content to the design window, save the last action performed, and/or repeat the last action performed.

The accessory region 158 may be populated with tools that a user may utilize to build the industrial automation project. For example, in the instant embodiment, the tool box 162 includes tools that allow a user to manipulate the project within the design region 152. For example, the tool box 162 may include tools for zoom in, zoom out, select, draw line, draw shape, change view, and so forth. The definitions/objects 164, the logic 166, and the HMI widgets 168 may include icons representing objects that a user can drag and drop into the design window 550 to add to the project. In some embodiments, the accessory region 158 may be scrollable to reveal additional windows with icons that can be dragged into the design region 152. Accordingly, the accessory region 158 shown in FIG. 7 is not intended to be limiting. The properties 160 may display properties of a selected item or may allow a user to search for items within the project or the various connected libraries having specific properties.

Figure 8:
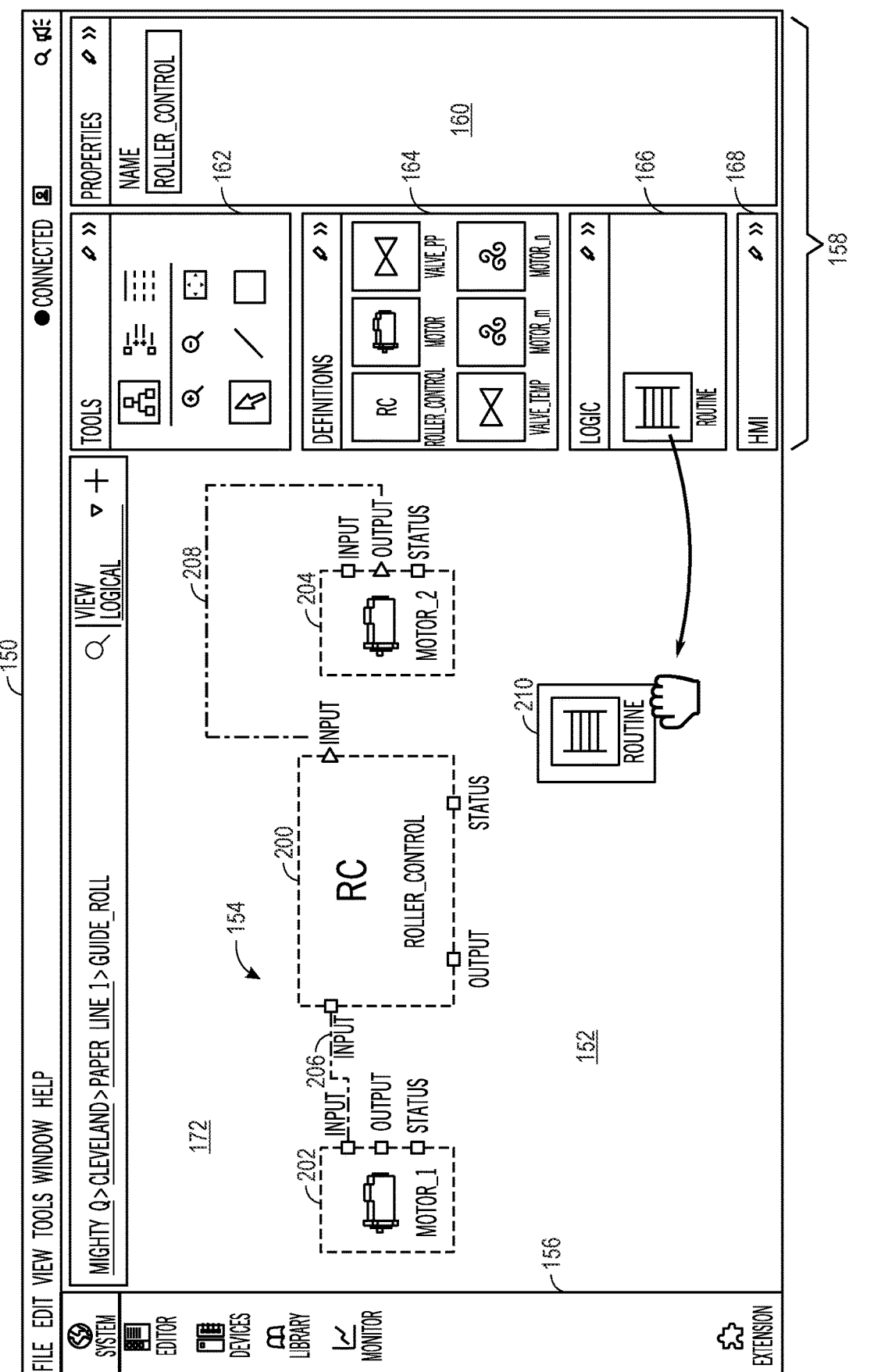
FIG. 8 is screenshot of the GUI of FIG. 7 showing details of a selected guide roll area in a design region of FIG. 7, in accordance with an embodiment.

After an area has been selected, the design region 152 may update or zoom in to show the selected area. For example, if the user has selected the guide roll area 172, the design region 152 updates to show the guide roll area 172. FIG. 8 is a screenshot of the GUI 150 showing details of the selected guide roll area 172 in the design region 152. As shown, the guide roll area 172 includes a roller control object 600, a first motor 202, and a second motor 204, and connections 206, 208 therebetween. Further, a routine 210 has been selected and is being dragged into the design region 152 to place it in the guide roll area 172.

After an object has been selected and placed in the design region 152, other objects may be selected and dragged into the design region 502 to join the other objects in the guide roll area 172. In some embodiments, the system may reference compatibility data and/or rules to determine whether or not an object the user drags into the design region 152 is compatible with the other objects that are already in the area. The rules may include guidelines that define and/or dictate relationships between industrial automation devices or components. If the user attempts to drag an incompatible object into the design region 152, or the user attempts to connect a two or more objects in an incompatible way, a warning message may be displayed warning the user that the new object is not compatible with the one or more other objects in the design region 152 or that the drawn connection is not valid. In some embodiments, the system may prevent the user from placing incompatible objects in the design region 152, whereas in other embodiments, the user may be capable of overriding the system. Further, whether the user has authority to override the system may be dependent upon permissions granted to the user, the user's rank, the user's department, the user credentials, etc.

After multiple objects have been placed in an area, the inputs, outputs, statuses, and other interface elements of the object may be identified and displayed. For example, after multiple objects have been added to an area, the design region 152 may update to identify inputs, outputs, status indicators, and/or other interface elements for each object. In some embodiments, the user may utilize the line drawing tool to draw lines identifying connections 206, 208 between the inputs, outputs, status indicators, and/or other interface elements of the various objects. In other embodiments, the system may utilize machine learning, historical data, compatibility data, preference data, and/or a set of rules to predict connections between the devices. In such an embodiment, the proposed connections may be suggested to a user via a message, which the user may review and accept or reject, either in bulk or individually. In other embodiments, the system may proceed to draw the suggested connections, which the user can delete if the user desires other connections.

The system may be configured to monitor actions by the user in designing the system and reference historical data to anticipate future actions and make suggestions. These may include, for example, adding one or more objects, adding one or more connections, specific configurations of objects, etc. In some embodiments, the system may reference historical data to find previous instances of the monitored actions taking place. The system may then, based on the historical data, identify a set of possible next actions. The set of next actions may then be assigned a probability based on the historical data. For example, the system may consider what percentage of instances in the historical data set when a specific combination of objects were being used that the next object added to the project was object A. In some embodiments, when the probability of a specific possible next action exceeds some threshold value, the system may generate a recommendation for the specific possible next action. In other embodiments, at certain intervals or upon certain actions taking place, the system may select the specific possible next action having the highest probability and generate a recommendation for the specific possible next action.

Further, as with the incompatible objects described above, the system may utilize historical data, compatibility data, preference data, and/or a set of rules to determine when connections provided by the user violate connection rules or are otherwise invalid. Because connecting the input of one object to the input of another object breaks the connection rules, a warning message may appear to notify the user that the connection is invalid. As with the incompatible objects described above, the system may prevent the user from drawing invalid connections at all. In other embodiments, the user may be capable of overriding the system, which may be dependent upon permissions granted to the user, the user's rank, the user's department, the user credentials, etc.

Figure 9:
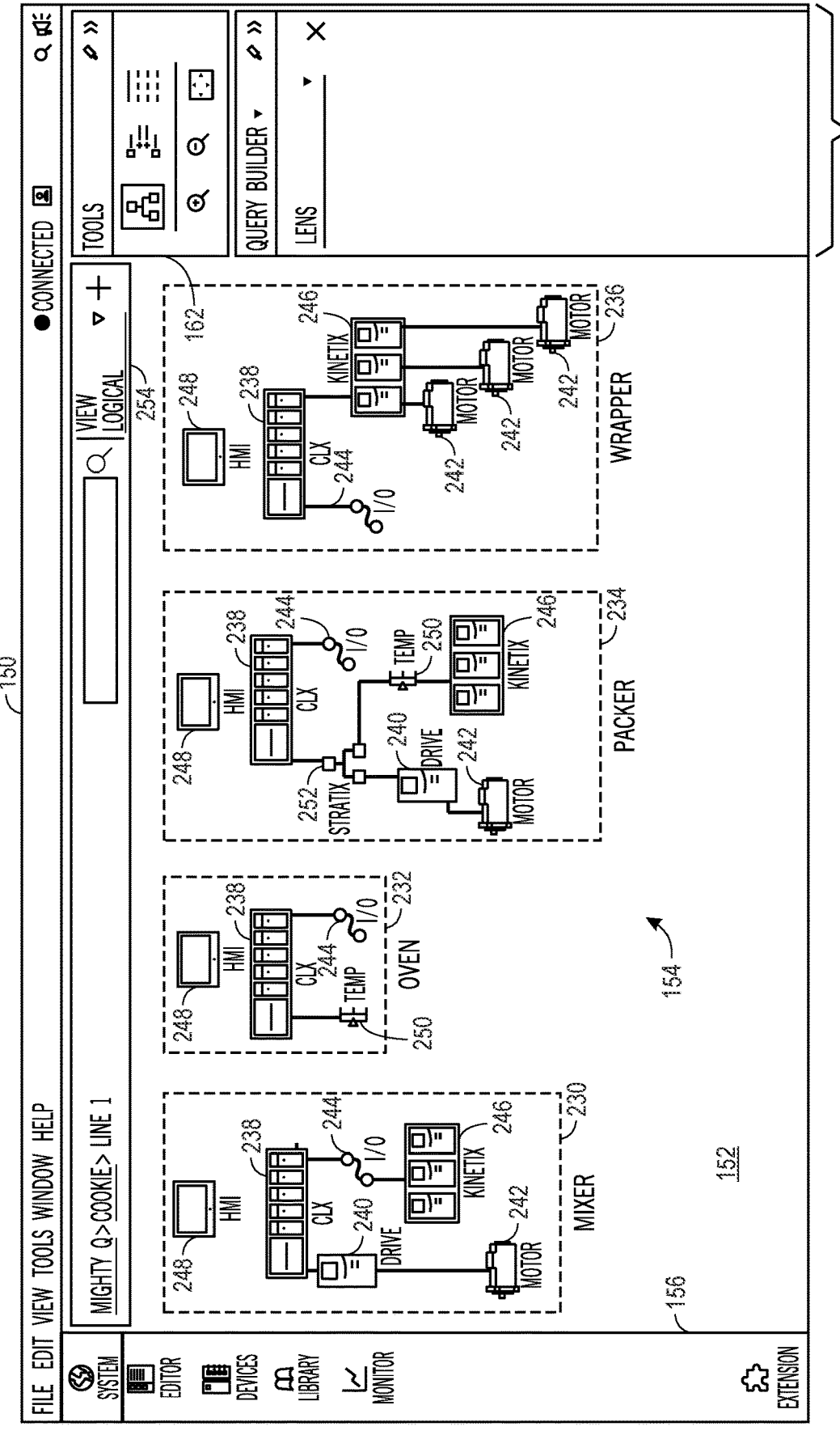
FIG. 9 illustrates an embodiment of the GUI of FIGS. 7 and 8 showing a project for a cookie making facility in a logical view style, in accordance with an embodiment.

In addition to objects from the definitions 164, the user can drag objects from other parts of the accessory region into the design region 152. For example, as shown in FIG. 8, a routine 616 has been selected and is being dragged it into the guide roll area 172 in the design region 152 along with the roller control object 200. The routine may define actions of one or more of the objects within the guide roll area 172 in the design region 152. It should be understood however, that the specific combinations of objects and elements shown in FIGS. 7-9 are merely examples and not intended to be limiting. Accordingly, other combinations of objects and elements are also envisaged.

Each object in the library may have a corresponding file of computer code or portion of computer code that defines object and the object's interaction with other objects within the library. When the design of a project is complete, or at intermittent time periods during development, the system may take the portions of code for each object in the project and modify the code based on the other objects in the project such that each object interacts with the other objects in the project as depicted in the design region 152. The modified portions of code may then be combined into a project code file that defines the operation of the entire project. By automatically generating the project code file manually, writing all of the code for the project code file is no longer the responsibility of the designer.

FIG. 9 illustrates an embodiment of the GUI showing a project for a cookie making facility in the logical view style. In FIGS. 7-9, the GUI 150 is shown in the logical view style, however, it should be understood that the GUI 150 may be configured to display projects in several different view styles that are selectable by the user. As shown, the design region 152 of the GUI 150 includes multiple areas including a mixer area 230, an oven area 232, a packer area 234, and a wrapper area 236. In the illustrated embodiment, the mixer area 230 includes an industrial controller 238 (e.g., CLX), a drive 240, a motor 242, an input/output (I/O) device 244, a motion control system 246 (e.g., KINETIX), and an HMI 248. The oven area 232 includes an industrial controller 238 (e.g., CLX), a temperature sensor 250, an I/O device 244, and an HMI 248. The packer area 234 includes an industrial controller 238 (e.g., CLX), an industrially managed Ethernet switch 252 (e.g., STRATIX), a drive 240, a motor 242, a temperature sensor 250, a motion control system 246 (e.g., KINETIX), and an HMI 248. The wrapper area 236 includes an industrial controller 238 (e.g., CLX), an I/O device 244, a motion control system 246 (e.g., KINETIX), three motors 242, and an HMI 248. It should be understood, however, that the particular combinations of components shown in FIG. 9 are merely examples and that many other combinations of components are envisaged. Further, it should be understood that the scope of possible industrial automation components is not intended to be limited to those shown in FIG. 9. As shown, the logical view is characterized by the various areas 230, 232, 234, 236 being separated from one another such the areas are self-contained and connections between components do not cross area boundaries (i.e., the dotted lines). Further, connections between components are represented by a single line. In some embodiments, not all components that are in communication with one another are connected by a line on the GUI 150. For example, though one or more components within an area may be in communication with the HMI 248, in the GUI 150 shown in FIG. 9, none of the HMIs 248 are connected to components with lines. Accordingly, the logical view offers a simplified view of a project that reduces the number of connections shown so as to communicate how the system components within an area interact with one another.

A user may toggle between various available view options (e.g., logical view, network view, and so forth) using a drop-down view menu 254. Whereas the connection lines within each area of in the logical view are mostly vertical, in the network view, the lines are mostly horizontal. Further, the areas emphasized in the logical view are deemphasized in the network view style. In some embodiments, area boundaries may be completely omitted. Accordingly, the network view style emphasizes network architecture and connections between components through which data (e.g., control signals, measurement signals, etc.) pass.

Figure 10:
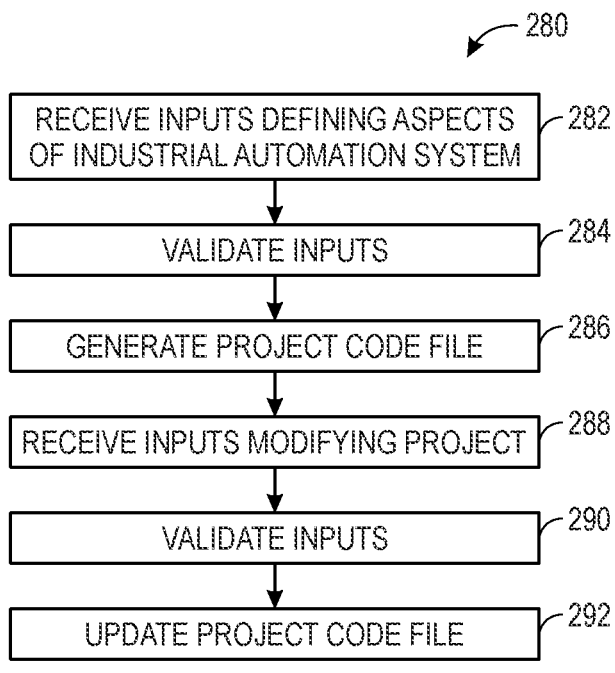
FIG. 10 is a flow chart of a process for generating and/or modifying project code files using the GUI of FIGS. 7-9, in accordance with an embodiment.

After the industrial automation system project has been designed (e.g., an initial design or modifications to a previous design) in the IDE, the system may generate a project code file that is representative of the design. FIG. 10 is a flow chart of a process 280 for generating and/or modifying project code files. At block 282, the system receives, via, for example, a user interface of an IDE, inputs defining various aspects of an industrial automation system. As described with respect to FIGS. 7-9, a user may provide inputs via the IDE to specify which devices are included in the industrial automation system, how those devices are connected and communicate with one another, flow of materials (e.g., raw materials, mid-process materials, product, etc.) through the industrial automation system, properties of the devices of the industrial automation system (e.g., characteristics such as make, model, serial number, device configuration, firmware/software version, included features, loaded software, logic, or control schemes, operational parameters, operational limits, compatibility information, etc.), logic and/or control schemes utilized by the industrial automation system, policies enforced by the industrial automation system, electrical power characteristics of the industrial automation system (e.g., current and/or voltage draw/load/generation, power draw/load/generation), communication characteristics of the industrial automation system (e.g., communication protocols used, encryption usage), network infrastructure, maintenance/service schedule/history, and so forth.

At block 284, the inputs received are validated using one or more sets of rules (e.g., via a rules engine). For example, the process 280 may consider the inputs provided in view of the one or more sets of rules and determine whether the inputs comply with the one or more sets of rules. For example, the process 280 may determine that one or more devices in the industrial automation system are incompatible with one another, or will not work as configured in the industrial automation project. The process 280 may also determine that one or more devices within the industrial automation project may be running incompatible configurations, software, firmware, etc. Further, the process 280 may determine that devices may not be capable of running certain logic or control schemes set forth in the industrial automation project, or that certain logic or control schemes used in the industrial automation project do not comply with the one or more sets of rules, or are not used in a way that complies with the one or more sets of rules. Additionally, the process 280 may determine that set operational parameters, parameter thresholds, parameter limits, etc. set forth in the industrial automation project do not comply with the one or more sets of rules. It should be understood that these are merely examples and that validation may include other steps and that the one or more rules may cover other aspects of the industrial automation project not discussed above.

Validation may be performed on a rolling basis, on a periodic basis after some period of time has elapsed (e.g., 1 minute, 10 minutes, 15 minutes, 30 minutes, 1 hours, 2 hours, 8 hours, 12 hours, 24 hours, and so forth), in response to some triggering action (e.g., an input provided to the IDE, such as adding a device, removing a device, changing a device's location, adding or removing connections between devices, adding or removing logic or control schemes, saving a project, receiving a request to output or update a project code file, etc.), upon request, etc. Accordingly, validation may be performed multiple times as an industrial automation project is being designed, or after an industrial automation design project has been defined and before a project code file is generated for the industrial automation design project.

At block 286, the process 280 generates a project code file for the industrial automation project. As previously discussed, the project code file may be one or more portions of code that define various aspects of the industrial automation project. For example, the project code file may specify which devices are included in the industrial automation system, how those devices are connected and communicate with one another, flow of materials through the industrial automation system, properties of the devices of the industrial automation system, logic and/or control schemes utilized by the industrial automation system, policies enforced by the industrial automation system, electrical power characteristics of the industrial automation system, communication characteristics of the industrial automation system, network infrastructure, maintenance/service schedule/history, and so forth. As described with regard to FIGS. 7-9, each object (e.g., device, logic, control scheme, etc.) available in the IDE may be represented by a respective piece of code that represents the object. Accordingly, the project code file may include the respective pieces of code for the objects used in the industrial automation project, and/or the project code file may reference the respective pieces of code for the objects used in the industrial automation project. In some embodiments, the project code file and/or the pieces of code for the objects used in the industrial automation project may be used in the setup, configuration, and/or operation of the industrial automation system when the actual real-world industrial automation system is built out.

At block 288, the process 280 receives, via, for example, the user interface of the IDE, inputs modifying the industrial automation project. As previously described, the inputs may include, for example, which devices are included in the industrial automation system, how those devices are connected and communicate with one another, flow of materials (e.g., raw materials, mid-process materials, product, etc.) through the industrial automation system, properties of the devices of the industrial automation system (e.g., characteristics such as make, model, serial number, device configuration, firmware/software version, included features, loaded software, logic, or control schemes, operational parameters, operational limits, compatibility information, etc.), logic and/or control schemes utilized by the industrial automation system, policies enforced by the industrial automation system, electrical power characteristics of the industrial automation system (e.g., current and/or voltage draw/load/generation, power draw/load/generation), communication characteristics of the industrial automation system (e.g., communication protocols used, encryption usage), network infrastructure, maintenance/service schedule/history, and so forth.

At block 290, the inputs modifying the project are validated using the one or more sets of rules (e.g., via a rules engine). In some embodiments, validation may be limited to the inputs modifying the project in order to reduce the time to validate the modified project. Such an embodiment may be useful when modifications are relatively minor and not expected to have a significant impact on the industrial automation project. However, in other embodiments, a full validation of the entire industrial automation project may be done. As described with respect to block 284, the process 280 may consider the inputs provided in view of the one or more sets of rules and determine whether the inputs comply with the one or more sets of rules. This may include, for example, determining that one or more devices in the industrial automation system are incompatible with one another, or will not work as configured in the industrial automation project, determining that one or more devices within the industrial automation project may be running incompatible configurations, software, firmware, etc., determining that devices may not be capable of running certain logic or control schemes set forth in the industrial automation project, or that certain logic or control schemes used in the industrial automation project do not comply with the one or more sets of rules, or are not used in a way that complies with the one or more sets of rules, determining that set operational parameters, parameter thresholds, parameter limits, etc. set forth on the industrial automation project do not comply with the one or more sets of rules, and so forth. It should be understood, however, that these are merely examples and that validation may include other steps and that the one or more rules may cover other aspects of the industrial automation project not discussed above.

At block 292, the project file is updated based on the modifying inputs or a new project code file is generated based on the modified industrial automation project. The project code file and/or the pieces of code for the objects used in the industrial automation project may be used in the setup, configuration, modification, and/or operation of the industrial automation system when the actual real-world industrial automation system is built out and/or updated/modified.

Figure 11:
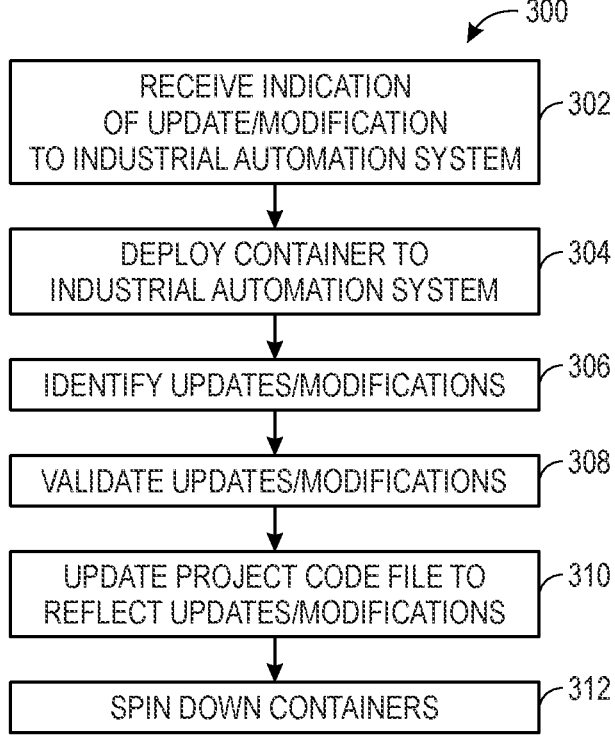
FIG. 11 is a flow chart of a process for performing recurring design validation in an industrial automation system, in accordance with an embodiment.

The project code file may be utilized by the container-based techniques described with regard to FIGS. 1-6 to perform various functionality within an OT network. For example, the project code file and the one or more sets of rules (e.g., via the rules engine) may be used to perform recurring design validation as the industrial automation system is updated and/or modified. Additionally, the project code file may be used as a reference to identify devices and/or compute surfaces within the OT network that may be capable of running containers. For example, FIG. 11 is a flow chart of a process 300 for performing recurring design validation in an industrial automation system.

At block 302, an indication of an update or modification to an industrial automation system is received. The indication may be triggered by a new device being connected to the system, new software/firmware being installed, devices being connected in different ways, a change in the configuration of one or more devices, a change in one or more operating parameters, a policy update, a change in state, and so forth. Accordingly, the update or modification may be automatically detected when it occurs or when a change takes place. In other embodiments, a configuration change, firmware update, software update, and so forth may automatically trigger an indication of an update/modification. In some embodiments, probes may be deployed within an OT network to detect and identify hardware and/or software running on the OT network, and/or network traffic within/across the OT network may be monitored to detect and identify hardware and/or software running on the OT network.

At block 304, one or more containers may be deployed within the OT network. In some embodiments, the one or more containers may be deployed to a compute surface of, or a compute surface nearby, the added, removed, or modified device, and/or the device running the added, removed, or modified software, firmware, logic, control scheme, etc. However, in other embodiments, containers may be deployed throughout the OT network. At block 306, the process 300 identifies, via the deployed containers, any other updates/modifications that have taken place within the OT network and/or identifies ramifications of the update/modification associated with the received indication throughout the OT network. In some embodiments, identifying updates/modifications, may include monitoring network traffic within the OT network for signs of an update or modification within the OT network and/or probing devices (e.g., sending network messages to devices within the OT network requesting information) for information about characteristics of the device, other devices to which the probed device is connected, software, firmware, logic, and/or control schemes running on the devices, and so forth. In some embodiments the scope of the identification of updates/modification may span multiple OT networks (e.g., across one or more facilities), may be an entire OT network, a portion of an OT network (e.g., a particular area or line), or one or more particular devices.

At block 308 the identified updates/modifications are validated using one or more sets of rules (e.g., via a rules engine). For example, the process 300 may consider the updates/modifications in view of the one or more sets of rules and determine whether the updates/modifications comply with the one or more sets of rules. For example, the process 300 may determine that updates/modifications utilize one or more devices in the industrial automation system are incompatible with one another, or will not work as configured. The process 300 may also determine that the updates/modifications may cause one or more devices within the industrial automation system to run incompatible configurations, software, firmware, etc. Further, the process 300 may determine that the updates/modifications may cause devices to run incompatible logic or control schemes, or that certain logic or control schemes used in the industrial automation system do not comply with the one or more sets of rules, or are not used in a way that complies with the one or more sets of rules. Additionally, the process 300 may determine that set operational parameters, parameter thresholds, parameter limits, etc. used in the industrial automation system do not comply with the one or more sets of rules. It should be understood, however, that these are merely examples and that validation may include other steps and that the one or more rules may cover other aspects of the industrial automation system, and/or updates/modifications to the industrial automation system, not discussed above.

At block 310, in response to all of the identified updates/modifications being validated, the process may update the project code file to reflect the updates/modifications, which may include generating a new project code file that reflects the updated/modified industrial automation system. The project code file and/or the pieces of code for the objects used in the industrial automation project may be used in subsequent, configuration, modification, and/or operation of the industrial automation system. If all of the identified updates/modifications are not validated, a notification may be generated. In some embodiments, a network administrator may be notified. Further, in some embodiments, the industrial automation system may be disabled or shift to a safe mode, or some other mode of reduced capability until a set of updates/modifications is validated.

At block 312, the deployed containers may be spun down such that computing resources used to run the deployed containers may be utilized for other functions. However, in some embodiments, one or more of the deployed containers may continue to run to monitor the OT network and/or the industrial automation system and identify subsequent updates/modifications there to.

Figure 12:
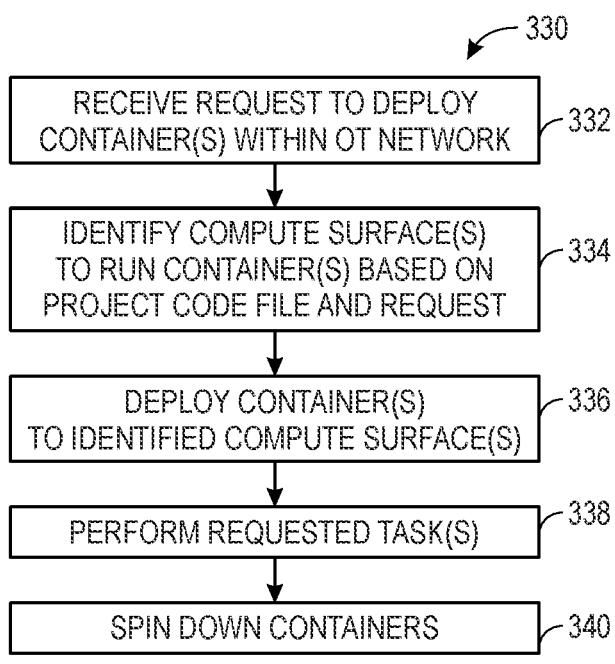
FIG. 12 is a flow chart of a process for using a project code file generated based on inputs to an IDE to perform container orchestration, in accordance with an embodiment.

FIG. 12 is a flow chart of a process 330 for using a project code file to perform container orchestration. At block 332, a request to deploy one or more containers within an OT network is received. In some embodiments, the request may be a request generated by a user. However, in other embodiments, the request may be automatically generated based on some trigger event taking place, some condition being detected, and so forth.

At block 334, the process 330, via the container orchestration system described above, identifies one or more compute surfaces on which to run the one or more containers. In the instant embodiment, the container orchestration system utilizes a project code file for the industrial automation system to identify the one or more compute surfaces on which to run the one or more containers, however, it should be understood that the container orchestration system may utilize additional pieces of information and consider other factors in determining how and where to deploy the one or more containers. As previously discussed, the project code file includes one or more portions of code that define the architecture and function of the industrial automation system. For example, the project code file may specify which devices are included in the industrial automation system, how those devices are connected and communicate with one another, flow of materials through the industrial automation system, properties of the devices of the industrial automation system, logic and/or control schemes utilized by the industrial automation system, policies enforced by the industrial automation system, electrical power characteristics of the industrial automation system, communication characteristics of the industrial automation system, network infrastructure, maintenance/service schedule/history, and so forth. Accordingly, because the project code file acts as a representation of the industrial automation system, it may be useful in identifying devices, computing surfaces, and other computing resources in the OT network, and in some cases, functions performed by those computing resources. As such, the project code file may help the container orchestration system identify computing resources in the OT network that may be capable of running the requested containers without jeopardizing their respective primary function(s).

For example, the container orchestration system may utilize the project code file to recognize that a particular device in the industrial automation system identified in the project code file (e.g., a controller, an edge device, a motor control center (MCC), an internet of things (IoT) device, a computer terminal, a tablet, a mobile device, a human machine interface, a server, or some other computing device) may have a certain amount of computing resources, and has an amount of available computing resources because only a portion of its computing resources are being utilized to perform assigned functions. Because running the container is expected to utilize few computing resources than the device has available, the container orchestration system may determine that the particular device has sufficient available computing resources to run the container. Though the above example is for a single device, it should be understood that that similar processes may be performed for multiple devices within the industrial automation system.

At block 336, the one or more containers are deployed to the identified computing resources. As previously described, deployment may include, for example, generating or retrieving a container image and transmitting the container image to a respective compute surface for execution. The deployment may include, for example, deploying multiple containers to one or more compute surfaces. For example, in some embodiments, the container orchestration system may deploy a pod of containers (e.g., a group of containers) to a single compute surface, wherein the pod of containers is configured to coordinate amongst one another to perform one or more of the requested tasks, or a portion of a requested task.

At block 338, the container orchestration system monitors the one or more deployed containers as the one or more deployed containers perform the requested function. Along these lines, in some embodiments, multiple deployed containers may coordinate with each other and/or one or more other existing containers to perform the requested tasks via chainable compute. As used herein chainable compute refers to a set of distributed computing resources (e.g., computing devices, compute surfaces, containers, virtual machines, etc.) that are capable of breaking a computing operation into component tasks and transmitting data between one another to complete the computing operation. Accordingly, a first computing resource may receive data from one or more second computing resources, perform one or more data processing operations on the received data, and then output results of the data processing operations back to the second computing resources or to one or more third computing resources. As such, sequences of data processing operations may be broken up into tasks, or sets of tasks, and assigned to specific computing resources within the set of distributed computing resources, which coordinate to complete the sequence of data processing operations.

In some embodiments, containers may perform the same or different tasks in parallel. For example, a first computing resource may perform a first task at the same time that a second computing resource performs a second task. In some embodiments, the outputs of the first and second tasks may be provided as inputs to a third task being performed by a second computing resource. Additionally, or alternatively, first and second computing resources may perform the same or similar tasks in parallel and the results compared. In other embodiments, the output of a data processing task may act as the input for multiple subsequent data processing tasks. Further, in some embodiments, multiple data processing tasks may be performed by a single computing resource, in series, in parallel, or some combination thereof.

At block 340, the deployed containers may be spun down such that computing resources used to run the deployed containers may be utilized for other functions. However, in some embodiments, one or more of the deployed containers may continue to run to monitor the OT network and/or the industrial automation system and identify subsequent updates/modifications there to.

The presently disclosed techniques include using industrial automation system project code files with container orchestration systems. Specifically, inputs may be provided to an integrated design environment (IDE) to design an industrial automation system. One or more rules may be applied to the inputs (e.g., via a rules engine) to validate that the inputs comply with the one or more rules, which may govern design of the industrial automation system. A project code file may be generated based on the inputs to the IDE that specify various aspects of the industrial automation system, such as a structure of the industrial automation system, one or more functions of the industrial automation system, logic and/or control schemes utilized by the industrial automation system, and so forth. Once the industrial automation system has been built out, the project code file and the one or more rules may be utilized by a container orchestration system to validate updates to the industrial automation system and update the project code file to reflect the updates to the industrial automation system, or generate a new project code file that reflects the updates to the industrial automation system. Specifically, the container orchestration system may receive an indication of an update or modification to the industrial automation system and deploy one or more containers to the industrial automation system. The deployed containers may confirm the update or modification and, in some cases, identify any additional updates/modifications that may have gone undetected. The containers may apply the one or more sets of rules to validate the updates or modifications, and then update the project code file to reflect the updates to the industrial automation system, or generate a new project code file that reflects the updates to the industrial automation system.

Further, the project code file may be utilized by the container orchestration system to better identify available computing resources within the industrial automation system. For example, the container orchestration system may receive a request to deploy one or more containers within an industrial automation system to perform one or more tasks. The container orchestration system may utilize the project code file, and in some cases other data, to identify available compute surfaces or other computing resources within the industrial automation system. The container orchestration system may then deploy one or more containers to the identified compute surfaces for performance of the requested tasks. The container orchestration system may monitor the deployed containers as they perform the requested tasks and then spin the deployed containers down with the requested task has been completed.

By using the disclosed techniques, an accurate project code file may be maintained as an industrial automation system is updated/modified over time, ensuring that an accurate representation of the industrial automation system is available that accurately represents the real-world industrial automation system. Further, as changes and/or modifications are made to the industrial automation system, the changes/updates are validated by applying rules to ensure that the industrial automation system is in compliance with any rules or guidelines an enterprise puts in place for the industrial automation system. Further, the available and up-to-date project code file may assist a container orchestration system in identifying available computing resources within the industrial automation system, resulting in more efficient usage of available computing resources within the industrial automation system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A non-transitory computer readable medium storing instructions that, when executed by a processor, cause the processor to perform actions comprising:

receiving a request to deploy a container within an industrial automation system to perform a data processing task, wherein the industrial automation system comprises a plurality of devices configured to perform a plurality of operations within the industrial automation system, and wherein each of the plurality of devices comprises a compute surface configured to perform one or more software tasks;

retrieving a project code file for the industrial automation system, wherein the project code file comprises a portion of code that represents a structure of the industrial automation system, one or more functions of the industrial automation system, and computing resources available within the industrial automation system;

identifying, based on the data processing task and the project code file, a respective compute surface of a particular device of the plurality of devices to which to deploy the container;

deploying the container to the respective compute surface of the particular device of the plurality of devices, wherein the container is configured to perform the data processing task receiving an additional request to deploy an additional container to perform an additional data processing task;

identifying, based on the additional data processing task and the project code file, an additional respective compute surface of an additional particular device of the plurality of devices to which to deploy the additional container;

deploying the additional container to the additional respective compute surface of the additional particular device of the plurality of devices, wherein the additional container is configured to perform the additional data processing task; and monitoring the deployed additional container as the deployed additional container performs the additional data processing task.

2. The non-transitory computer readable medium of claim 1, wherein the actions comprise:

receiving, via a graphical user interface (GUI) of an integrated design environment (IDE), inputs specifying one or more aspects of the structure of the industrial automation system, or the one or more functions of the industrial automation system, or both; and generating the project code file based on the received inputs.

3. The non-transitory computer readable medium of claim 2, wherein the inputs comprise selection of an object from a library of objects within the GUI of the IDE, and placement of the selected object within a design region of the GUI of the IDE.

4. The non-transitory computer readable medium of claim 2, wherein the actions comprise determining that the inputs comply with one or more sets of rules.

5. The non-transitory computer readable medium of claim 1, wherein the project code file specifies the plurality of devices included in the industrial automation system, how the plurality of devices are connected to one another, a flow of material through the industrial automation system, one or more properties of the plurality of devices of the industrial automation system, logic utilized by the industrial automation system, control schemes utilized by the industrial automation system, one or more policies enforced by the industrial automation system, electrical power characteristics of the industrial automation system, communication characteristics of the industrial automation system, a network infrastructure associated with the industrial automation system, a maintenance schedule for the industrial automation system, a service schedule for the industrial automation system, a maintenance history for the industrial automation system, or a service history for the industrial automation system, or any combination thereof.

6. The non-transitory computer readable medium of claim 1, wherein the request is received from a client device based on inputs received via a graphical user interface (GUI) of the client device.

7. The non-transitory computer readable medium of claim 1, wherein the request is generated in response to a trigger event taking place.

8. The non-transitory computer readable medium of claim 1, wherein the request is generated in response to a condition being detected.

9. A method, comprising:

receiving a request to deploy a container within an industrial automation system to perform a data processing task, wherein the industrial automation system comprises a plurality of devices configured to perform a plurality of operations within the industrial automation system, and wherein each of the plurality of devices comprises a compute surface configured to perform one or more software tasks;

retrieving a project code file for the industrial automation system, wherein the project code file comprises a portion of code that represents a structure of the industrial automation system, one or more functions of the industrial automation system, and computing resources available within the industrial automation system;

identifying, based on the data processing task and the project code file, a respective compute surface of a particular device of the plurality of devices to which to deploy the container;

deploying the container to the respective compute surface of the particular device of the plurality of devices, wherein the container is configured to perform the data processing task;

monitoring the deployed container as the deployed container performs the data processing task;

receiving an additional request to deploy an additional container to perform an additional data processing task;

identifying, based on the additional data processing task and the project code file, an additional respective compute surface of an additional particular device of the plurality of devices to which to deploy the additional container;

deploying the additional container to the additional respective compute surface of the additional particular device of the plurality of devices, wherein the additional container is configured to perform the additional data processing task;

monitoring the deployed additional container as the deployed additional container performs the additional data processing task; and spinning down the deployed container.

10. The method of claim 9, wherein the container and the additional container are configured to perform the data processing task and the additional data processing task in parallel.

11. The method of claim 10, wherein the data processing task and the additional data processing task are the same.

12. The method of claim 10, wherein the data processing task and the additional data processing task are different from one another.

13. The method of claim 9, wherein deploying the container to the respective compute surface of the particular device of the plurality of devices comprises deploying a pod of containers, including the container, to the respective compute surface of the particular device of the plurality of devices, wherein the pod of containers comprises a plurality of containers configured to coordinate to perform the data processing task.

14. The method of claim 9, wherein deploying the container to the respective compute surface of the particular device of the plurality of devices comprises generating a container image representative of the container and transmitting the container image to the particular device.

15. The method of claim 9, wherein deploying the container to the respective compute surface of the particular device of the plurality of devices comprises retrieving a container image representative of the container and transmitting the container image to the particular device.

16. A non-transitory computer readable medium storing instructions that, when executed by a processor, cause the processor to perform actions comprising:

receiving a request to deploy a container within an industrial automation system to perform a data pro- cessing task, wherein the industrial automation system comprises a plurality of devices configured to perform a plurality of operations within the industrial automa- tion system, and wherein each of the plurality of devices comprises a compute surface configured to perform one or more software tasks;

retrieving a project code file for the industrial automation system, wherein the project code file comprises a portion of code that represents a structure of the indus- trial automation system, one or more functions of the industrial automation system, and computing resources available within the industrial automation system;

identifying, based on the data processing task and the project code file, a respective compute surface of a particular device of the plurality of devices to which to deploy the container;

transmitting a container image representative of the con- tainer to the respective compute surface of the particu- lar device of the plurality of devices, wherein the respective compute surface of the particular device of the plurality of devices is configured to execute the container image to run the container;

monitoring the container as the container performs the data processing task;

receiving an additional request to deploy an additional container to perform an additional data processing task;

identifying, based on the additional data processing task and the project code file, an additional respective compute surface of an additional particular device of the plurality of devices to which to deploy the addi- tional container;

deploying the additional container to the additional respective compute surface of the additional particular device of the plurality of devices, wherein the addi- tional container is configured to perform the additional data processing task; and monitoring the deployed additional container as the deployed additional container performs the additional data processing task.

17. The non-transitory computer readable medium of claim 16, wherein the actions comprise spinning down the container.

18. The non-transitory computer readable medium of claim 16, wherein the project code file is generated in response to inputs provided via a graphical user interface (GUI) of an integrated design environment (IDE) specifying one or more aspects of the structure of the industrial auto- mation system, or the one or more functions of the industrial automation system, or both.

19. The non-transitory computer readable medium of claim 16, wherein the project code file specifies the plurality of devices included in the industrial automation system, how the plurality of devices are connected to one another, a flow of material through the industrial automation system, one or more properties of the plurality of devices of the industrial automation system, logic utilized by the industrial automa- tion system, control schemes utilized by the industrial auto- mation system, one or more policies enforced by the indus- trial automation system, electrical power characteristics of the industrial automation system, communication character- istics of the industrial automation system, a network infra- structure associated with the industrial automation system, a maintenance schedule for the industrial automation system, a service schedule for the industrial automation system, a maintenance history for the industrial automation system, or a service history for the industrial automation system, or any combination thereof.

20. The non-transitory computer readable medium of claim 1, wherein the request is generated in response to an update or modification to the industrial automation system.

* * * * *